United States Patent [19]
Libit et al.

[11] Patent Number: 5,263,727
[45] Date of Patent: Nov. 23, 1993

[54] FOLDABLE LUGGAGE CARRIER

[75] Inventors: Jeffrey M. Libit, 13244 Circulo Largo Ct., NE., Albuquerque, N. Mex. 87112; Sidney Libit, Long Boat Key, Fla.

[73] Assignee: Jeffrey M. Libit, Albuquerque, N. Mex.

[21] Appl. No.: 978,998

[22] Filed: Nov. 19, 1992

[51] Int. Cl.5 .................................. B62B 1/04
[52] U.S. Cl. .............................. 280/40; 280/646; 280/655; 280/47.29
[58] Field of Search ............ 280/639, 39, 40, 645, 280/646, 652, 654, 655, 47.27, 47.29, 47.24

[56] References Cited

U.S. PATENT DOCUMENTS

| | | | |
|---|---|---|---|
| 3,043,603 | 7/1962 | Major, Sr. | 280/40 |
| 4,315,632 | 2/1982 | Taylor | 280/40 |
| 4,460,189 | 7/1984 | Goff | 280/646 X |
| 4,506,897 | 3/1985 | Libit | 280/40 |
| 4,761,012 | 8/1988 | Dames | 280/646 X |
| 4,845,804 | 7/1989 | Garrett | 280/37 X |

Primary Examiner—Margaret A. Focarino
Assistant Examiner—Michael Mar
Attorney, Agent, or Firm—Hill, Steadman & Simpson

[57] ABSTRACT

A collapsible luggage cart which can be stored in a frame container with a spring biased door such that when the door is released spring biased wheels open the door and move to the extended position where they clear the door which then moves to the closed position and locks the wheels in the extended positions. A U-shaped telescoping handle is provided and a pivotal luggage shelf attaches to the frame.

8 Claims, 5 Drawing Sheets

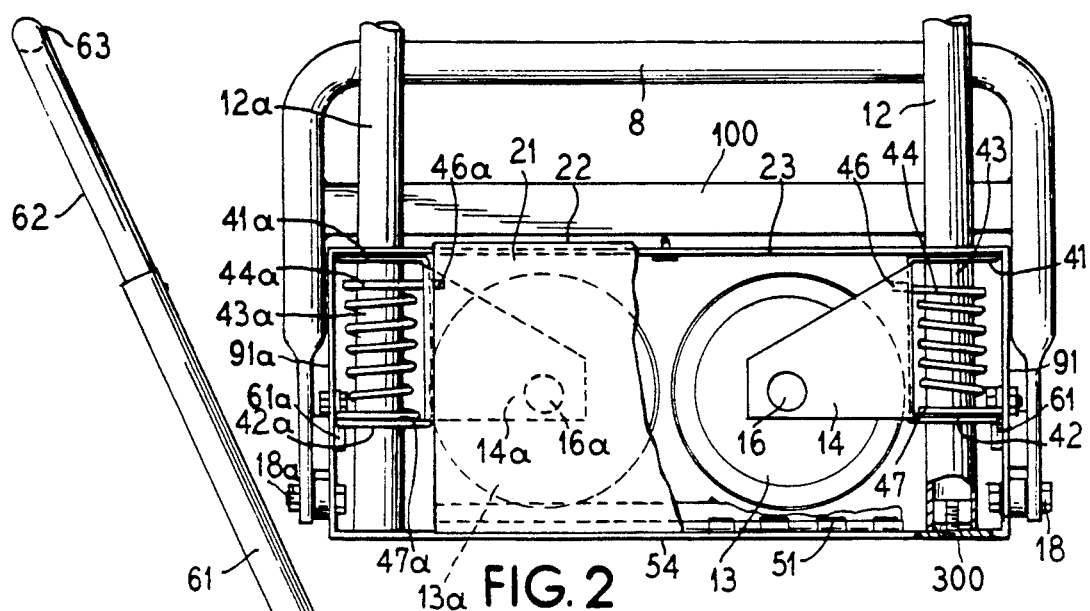
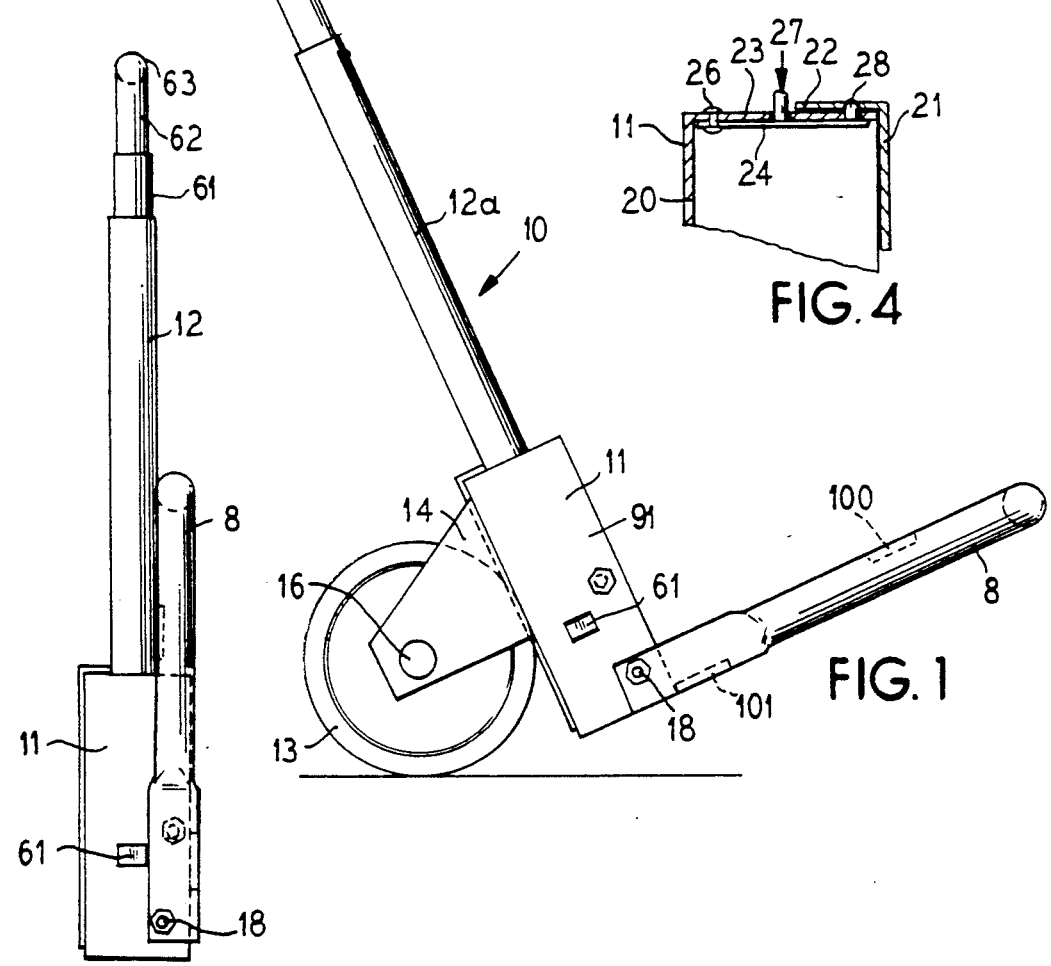

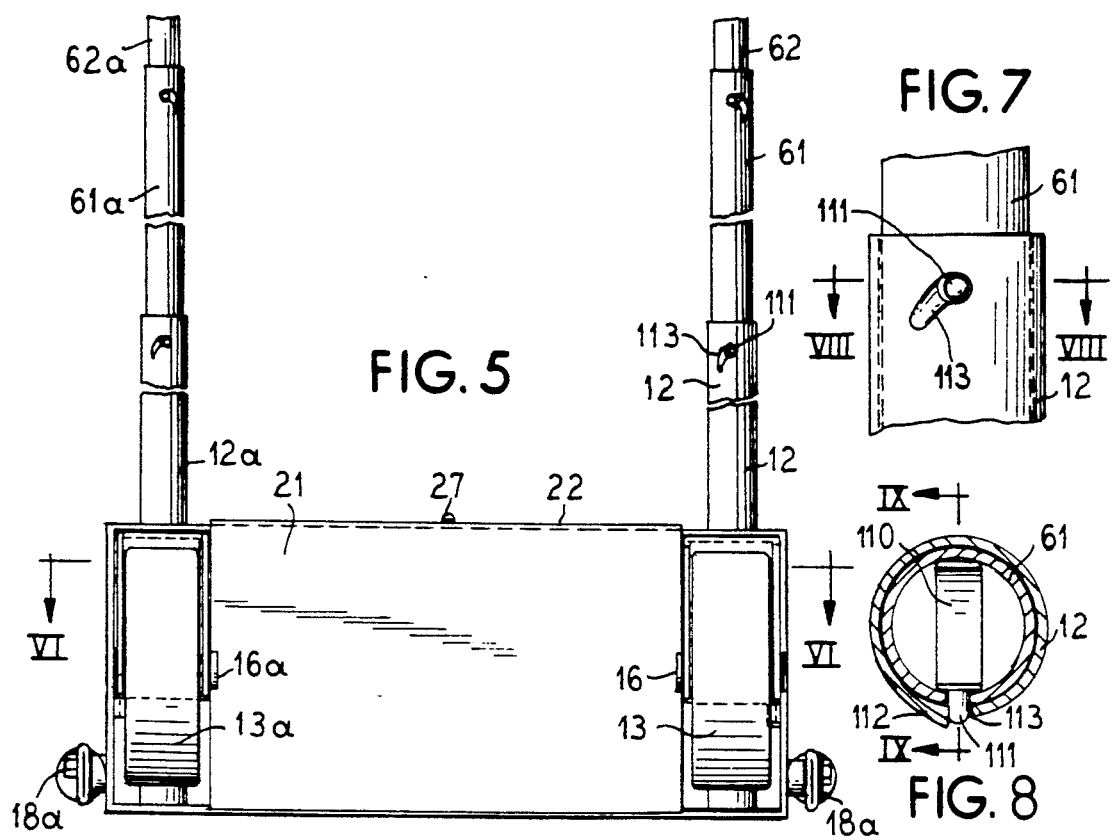
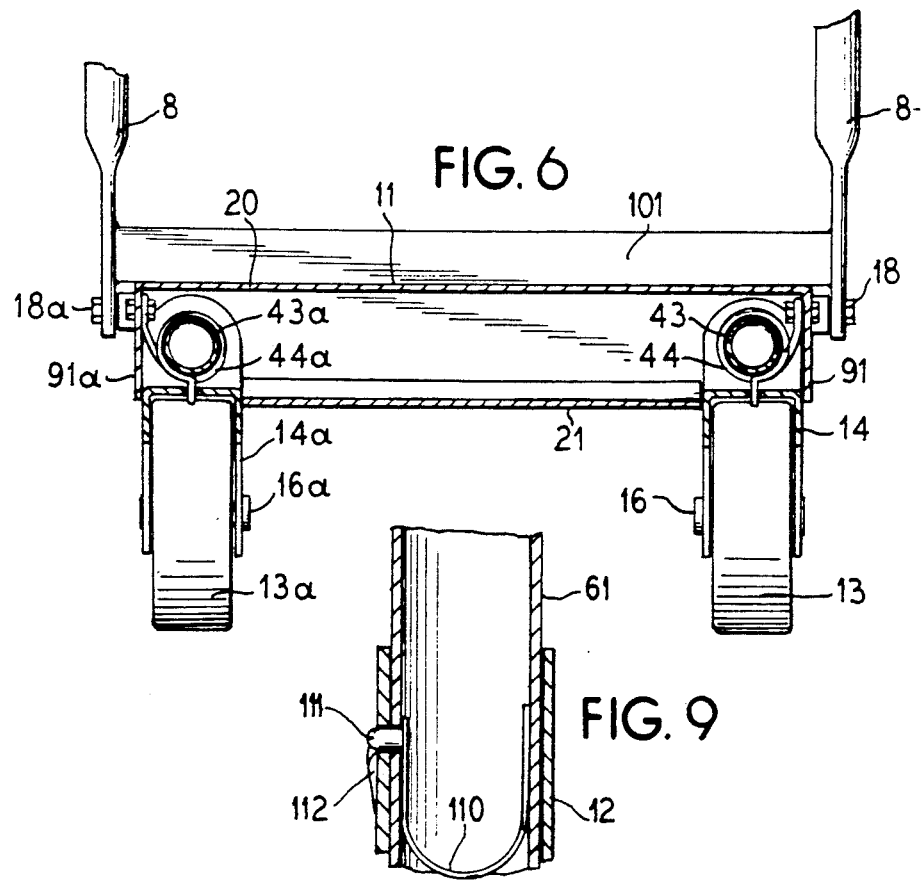

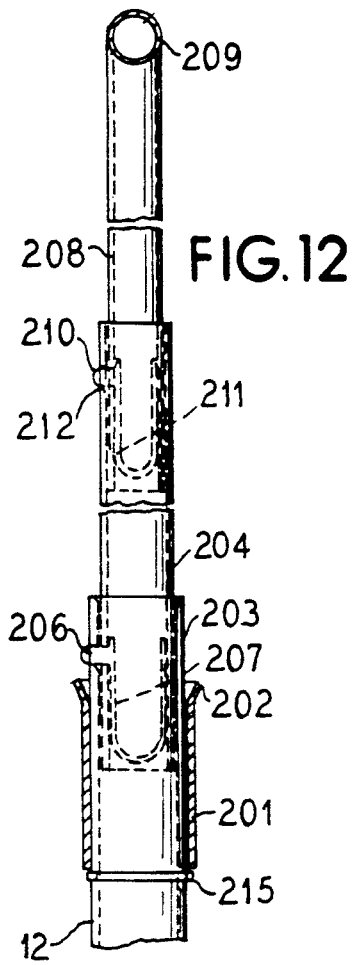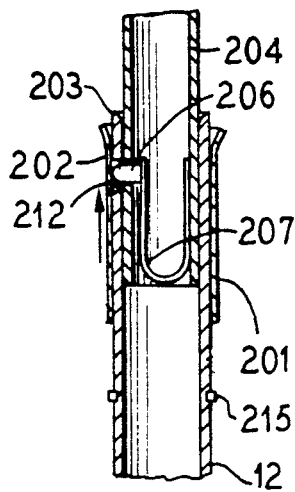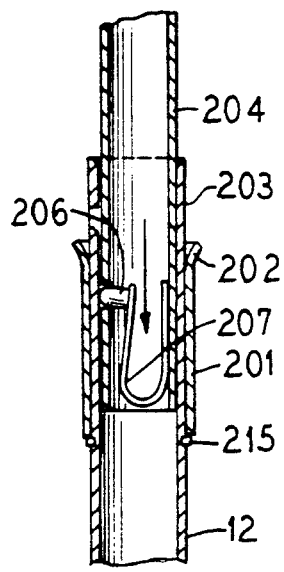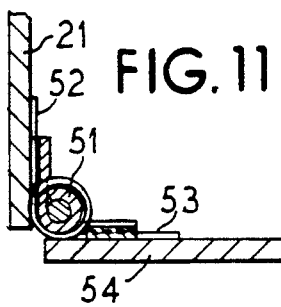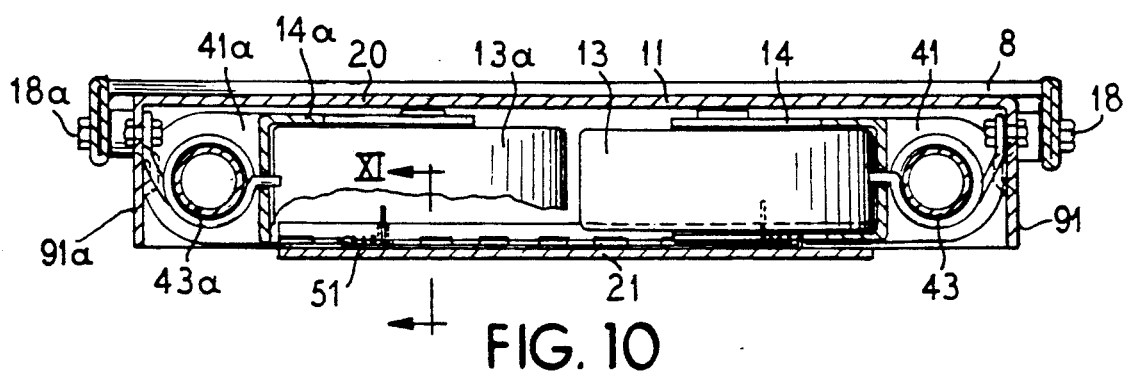

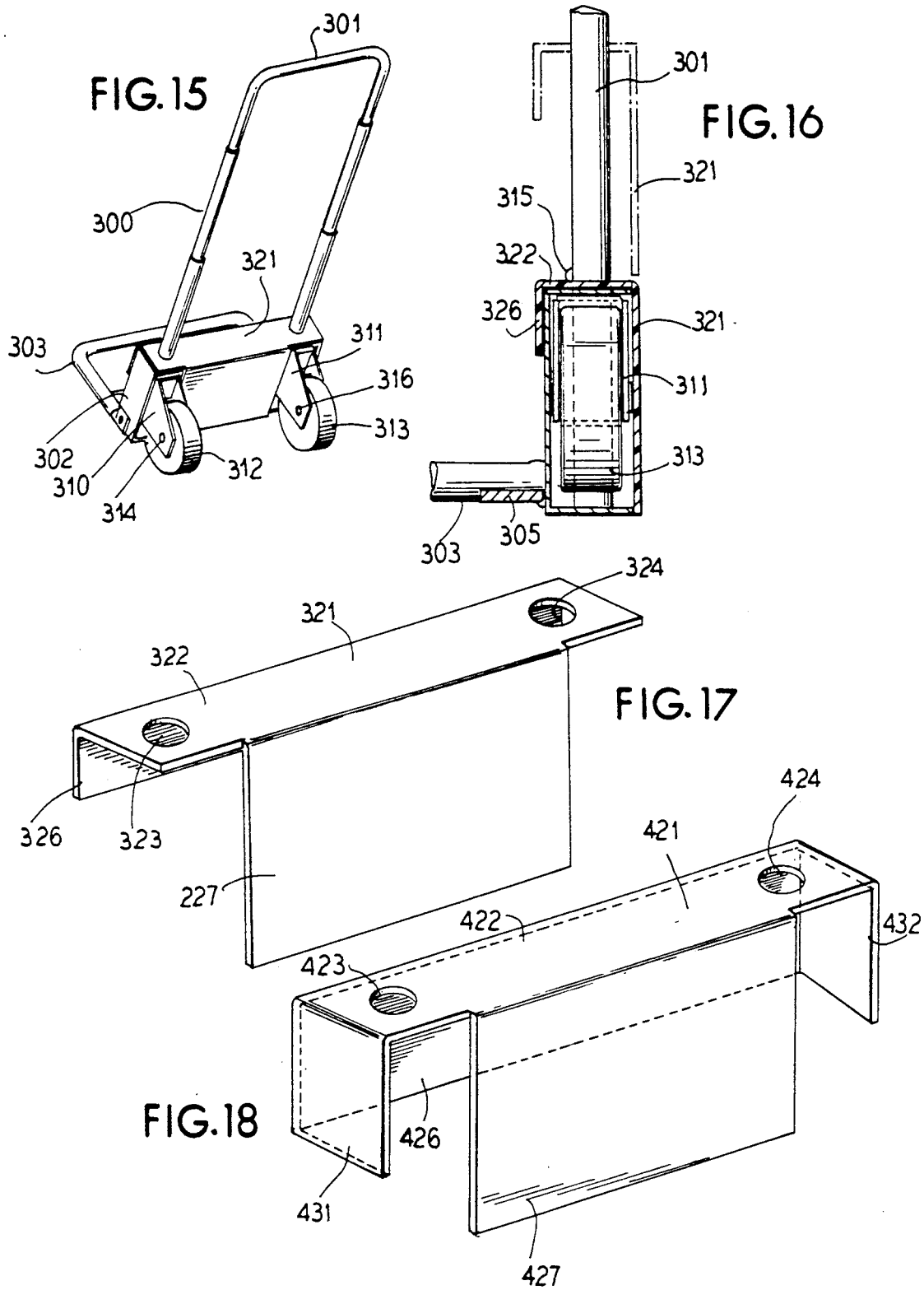

FOLDABLE LUGGAGE CARRIER

BACKGROUND OF THE INVENTION

1. Field of the Invention

This invention relates in general to luggage carriers and in particular to foldable collapsible luggage carriers.

2. Description of Related Art

The present invention comprises an improvement on U.S. Pat. No. 4,506,897 to Sydney M. Libit which issued on Mar. 26, 1985 and discloses a two wheeled collapsible cart.

SUMMARY OF THE INVENTION

The present invention comprises an improvement on U.S. Pat. No. 4,506,897 in which a cart automatically opens and locks the wheels. The invention also provides a brace welded to a tray which provides a down stop. The invention also has a collapsible U-shaped handle which can be collapsed or extended by using ball depressors. Another modification of the handle is to provide pocketed slots coupled with the rotation of the center span of the three-section telescoping handle so as to store the handle and open it. Luggage carriers for use in airports and elsewhere originally comprised constructed hand truck type carriers formed of bent and welded tubing and have now evolved to small lightweight collapsible members generally formed of stiff wire or small diameter rod. While such lightweight collapsible carriers have enjoyed increasing popularity, they suffer at least two disadvantages. They are generally equipped with very small diameter wheels which make movement over rough terrain or upstairs difficult and also they are awkward to collapse and are not easy to transport in the collapsed condition.

It is an object of the present invention to provide a collapsible luggage carrier which has large diameter wheels and which can still be collapsed into a small rectangular box-like assembly which is substantially flat on all six sides.

The present invention comprises a base member of generally rectangular configuration which includes a base frame that includes a flat surface having flanged walls depending from one side adjacent the periphery to produce a hollow bordered undersurface for the base. A pair of spaced wheel brackets are pivotally supported so that they can be pivoted between an uncollapsed position projecting from the undersurface of the base to a collapsed position substantially parallel with the undersurface of the base and such wheel brackets are spring-biased so that they tend to move to the open position. The hinges are spaced apart such that wheels can collapse toward each other and be confined within the boundaries of the hollow underside of the frame. A locking bracket member is pivotally attached to the underside or to a separate projecting cross-wall and is spring-biased to the closed position. When the locking bracket member is opened, the wheels will be spring-biased to the open position after which the locking bracket member can be moved between the wheel so as lock them in the open position and the locking bracket is preferably resiliently biased to the closed position so as to provide a lock due to an interference fit with the wheel brackets. A U-shaped pivoted shelf member is also attached to the frame member and provides a support for luggage to be carried by the device. The U-shaped frame member can also when in the non-pivoted position serve as a handle to carry the device.

The U-shaped telescoping collapsible handle is attached to the frame member and has side portions and a cross-handle portion and the side handle portions are collapsible and can be telescoped together by using ball depressors or by using slots which coupled with the rotation of the center span of the three section telescoping handle allow the handle to be telescoped into the stored position.

It is an object of the present invention to provide an improved lightweight luggage carrier which large wheels.

It is another object of the invention to provide a folding collapsible luggage carrier which has a pivoted undersurface portion that is spring biased to the closed position and which when opened allows spring biased wheel brackets to open after which the locking bracket member closes and provides a lock to prevent the wheels from moving to the folded position.

It is also an object to provide a luggage carrier with wheels that overlap each other.

Another object is to provide a sliding door for covering the wheels in the stored position and which lock the wheels in the open position.

It is an object to provide a cover for the wheels so that they cannot come in contact with the user's clothing. The box also serves as a fender to prevent mud and spray being thrown from the wheels.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a side plan view of the collapsible luggage carrier of the invention in the open position;

FIG. 2 is a partially section plan view of the luggage carrier in the closed or stored position;

FIG. 3 is a side plan view of the invention;

FIG. 4 is a sectional view illustrating the latching mechanism;

FIG. 5 is a bottom plan view of the invention;

FIG. 6 is a sectional view taken on line VI—VI of FIG. 5;

FIG. 7 is a cut-away detail view of the handle folding mechanism;

FIG. 8 is a sectional view taken on VIII—VIII of FIG. 7;

FIG. 9 is a sectional view taken on line IX—IX from FIG. 8;

FIG. 10 is a sectional view illustrating the stored position;

FIG. 11 is a detail view illustrating the hinge for cover 21;

FIG. 12 is a partially sectioned view illustrating the handle;

FIG. 13 is a detailed sectional view illustrating the lock for the handle in the locked position;

FIG. 14 is a detailed sectional view of the handle in the unlocked position;

FIG. 15 is a perspective view of a modified form of the invention;

FIG. 16 is a sectional view of FIG. 15 showing the wheels in the stored position;

FIG. 17 is a perspective view of a vertically slidable door for locking the wheels;

FIG. 18 is a modified form of the slidable door;

DETAILED DESCRIPTION OF THE PREFERRED EMBODIMENTS

Figure 19:
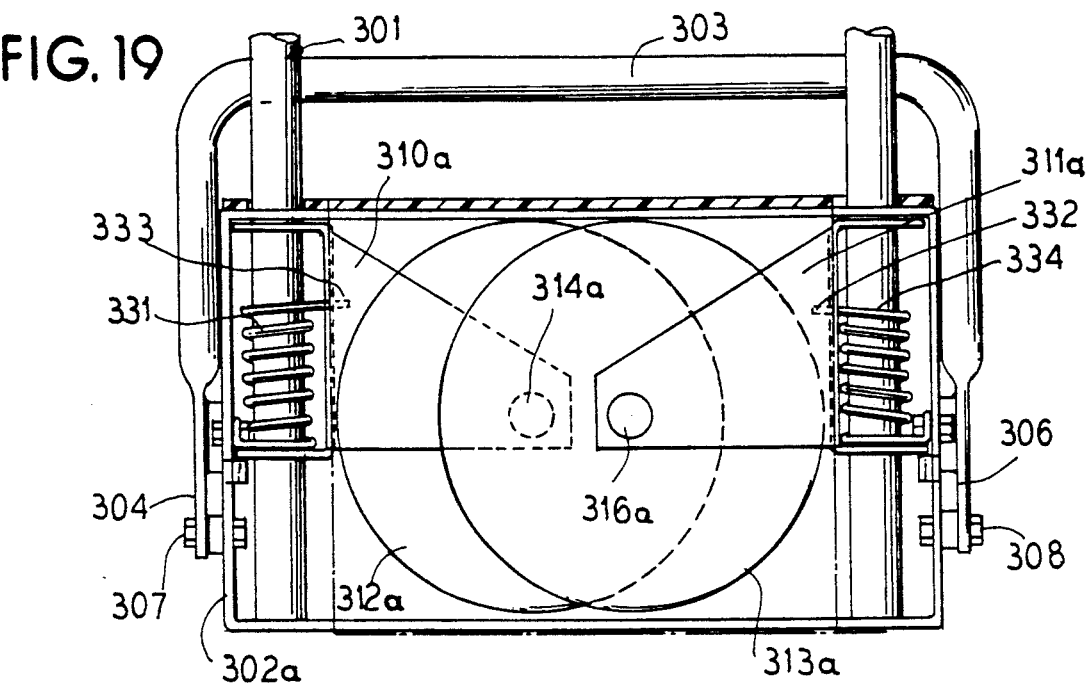
FIG. 19 illustrates the wheels in the stored position.

FIG. 1 illustrates the luggage cart 10 of the invention in the open position for carrying luggage and comprises a generally rectangularly-shaped frame member 11 to which a U-shaped handle member 12 is attached. A pair of pivotable wheel brackets 14 are mounted on either side of the base member 11 and pivotally carry wheels 13 which are mounted on suitable axles 16 and 16a. A luggage supporting tray 8 is generally U-shaped and has flatted ends which are pivotally attached to the opposite ends of the frame member by pivots 18 and 18a. A cross member 101 extends between the legs of the tray 8 and engages the rear wall 20 of the frame member 11 so as to provide a downward limit for the tray so that it can support luggage. A cross member 100 extends across the legs of the tray 8 so as to support luggage thereon.

As shown in FIG. 2, the lower ends 43 and 43a of the handle 12 and 12a extend into the frame member 11 and are attached to the bottom wall 54 of the frame member 11 by suitable set screws 300. Springs 44 and 44a, respectively, extend around the lower portions 43 and 43a of the handles 12 and 12a and have portions 46 and 46a which, respectively, engage the brackets 14 and 14a so as to spring bias the brackets to the open position. The lower ends 47 and 47a of the springs 44 and 44a are connected to lower portions 42 and 42a of the frame member 11.

A lid or cover member 21 has its lower portion pivotally connected to the lower edge 54 of the frame member 11 by spring biased hinges 51 which spring bias the cover member 21 to the closed position. A lip 22 of the cover member 21 fits over the upper wall 23 of the frame member 11 as shown in FIG. 4 and is formed with an opening into which a flexible pin 28 is received. It is to be noted that the lid 21 extends from the bottom to the top of the frame member but its ends do not extend to the ends so that the wheels can open to the extended position and the lid can close when the wheels are extended. A spring 24 is connected to the flexible pin 28 and has its other end connected to the upper member 23 by rivet 26. An actuator 27 extends through an opening in the wall 23 and is attached to the spring 24 such that the actuator 27 can move the spring 24 downwardly relative to FIG. 4 to remove the locking pin 28 from engagement with the portion 22 to allow the cover door to be moved to the open position.

As shown in FIG. 11, the cover member 21 is connected by the hinge 51 to the lower wall 54 of the frame member 11 and a spring 52 has one end which engages the wall 21 and a second end 53 which engages the wall 54 so as to bias the door 21 toward the closed position. The telescoping handle portions 12 and 12a extend upwardly from the frame member 11 and second handle portions 61 and 61a are received therein. An upper U-shaped handle portion has ends 62 and 62a which are received in the portions 61 and 61a and has a transverse handle portion 63 as illustrated in FIGS. 1 and 3. The lower edges 42 and 42a of the wheel brackets 14 and 14a engage stops 61 and 61a formed in the side walls 91 and 91a of the frame member 11 so as to hold the brackets 14 and 14a in position as shown in FIG. 2, for example. The handle 12 may be extended and telescoped to the stored position in two different manners. In the embodiments illustrated in FIGS. 5, 7 and 9, the central portions 61 and 61a of the handles can be rotated so as to unlock the locking pins 111 at either end thereof so as to allow the upper portions 62 and 62a and the central portions 61 and 61a to be telescoped into the lower portions 12 and 12a. When the central portion 61a, for example, is rotated, the edge 112 of the slot 113 engages the locking pin 111 and pushes it inwardly such that the locking pin 111 no longer locks the members 12 and 61 such that the member 61 can be moved downwardly into the member 12. Simultaneously, the pin which locks the members 61 and 62 is depressed as the portion 61 is rotated so as to unlock the members 61 and 62 so that the handle can be collapsed to the stored position.

FIGS. 12, 13 and 14 illustrate a second embodiment for locking handle portions 12 relative to central portions 204 and upper portions 208. The lower portion 12 has its upper portion 203 locked by locking pin 206 which is spring biased by a spring 207 so as to lock the central portion 204 to the upper portion 203 of the handle portion 12. When the locking pin 206 extends through aligned openings in the lower portion of the center section 204 and through an opening in the upper portion 203 of lower section 12, the handle portions 204 and 12 are locked in the extended position. The spring 207 is attached to the inner surface of central portion 204 as shown in FIGS. 13 and 14, for example. A moveable collar 201 engages a lower stop 215 on lower handle portion 12 and has an upwardly flared portion 202. When the sleeve 201 is moved upwardly, the flared portion 202 engages the locking pin 206 as shown in FIG. 13 so as to push it inwardly to the position shown in FIG. 13 so that the center portion 204 can be telescoped into the lower portion 12. The locking pin 206 has a curved outer end so that it will allow the upper portion 204 to fit inside the portion 12 as shown in FIG. 14 so that the central portion 204 can be telescoped into the lower portion. The upper portion 208 can also be telescoped into the central portion 204 by depressing the locking pin 210 which passes through opening 212 to allow the upper portion 208 to be telescope into the central portion 204. 209 illustrates the cross-piece which joins the two extending telescoping legs of the handle.

In operation, when the collapsible cart is in the closed position as illustrated in FIGS. 2, 3 and 10, for example, cover door 21 may be opened by depressing the actuator 27 to remove the locking pin 28 from engagement with the upper wall 22 of the door 22 so that the door 22 will be opened against its spring-biased hinge 51. When the door 51 is opened, the springs 44 and 44a will pivot the wheel brackets 14 and 14a to the opened or outer position illustrated in FIG. 6 after which the door 21 is released so it will close and lock the wheels in the outer positions. The luggage tray 8 can be pivoted to the position shown in FIG. 1 so that luggage can be mounted thereon. The handle 12 can be opened and moved to the locked position and the cart is ready for use. After the cart has been used, the door 21 can again be opened and the wheels moved to the position shown in FIG. 2 after which the door 21 can be closed to lock the wheels 13 and 13a in the stored position. The handle 12 can then be telescoped to the closed position and the tray 8 can be pivoted to the up position so that the luggage carrier has the shape shown in FIGS. 2, 3 and 10. The spring bias on the wheel can be such that when the cover door 21 is unlatched the wheels will push the door open and then the spring bias on the door will close the door.

A further modification of the invention is illustrated in FIGS. 15, 16, 17 which shows a luggage cart 300 that has a tray 303 that can be folded relative to the frame 302 and is connected by pivot pins 307 and 305 to the frame 302. In the embodiment illustrated in these figures rather than having a door 21 which pivots outwardly as in the embodiment illustrated in FIG. 5, a slidable door 321 is mounted on the handle 301 such that it can be moved to an upper position by depressing a detent 315 mounted in the handle 301 so as to allow the wheels 312 and 313 to move it outwardly under spring bias to the open position illustrated in FIG. 15. After the wheels have moved outwardly to the position shown in FIG. 15, the slide door member 321 is moved downwardly to the position illustrated in FIG. 15 so that its downwardly extending panel 27 engages the wheel brackets 310 and 311 to lock them in the open position as shown in FIG. 15. The closed position is illustrated in FIG. 16 wherein the wheels 312 and 313 have been moved inwardly to the stored position after which the cover member 321 has been moved downwardly until the detent 315 locks the cover member 321 to hold the wheels in the stored position.

FIG. 18 illustrates a modified form of the slide cover member and comprises a slide cover member 421 which has downwardly extending portion 427 for locking the wheel brackets as well as end downwardly extending portions 431 and 432 which extend partially down along the edges of the frame 302. The modified bracket 421 operates in much the same manner as the bracket 321 described above.

Figure 20:
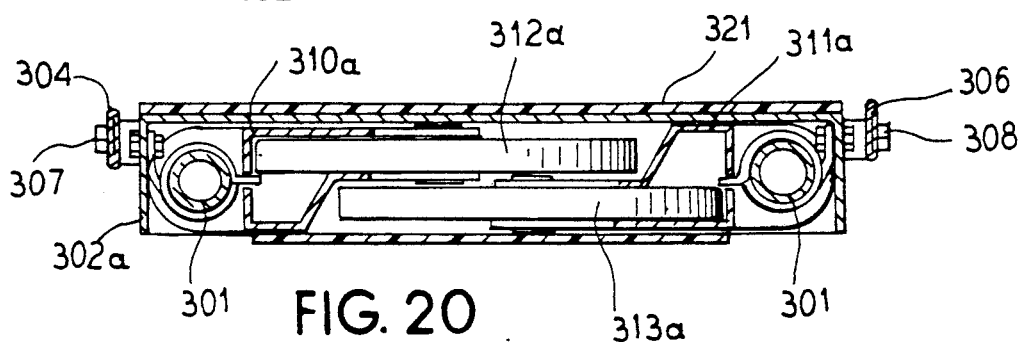
FIG. 20 is a top sectional view showing the wheels in the stored position.
Figure 21:
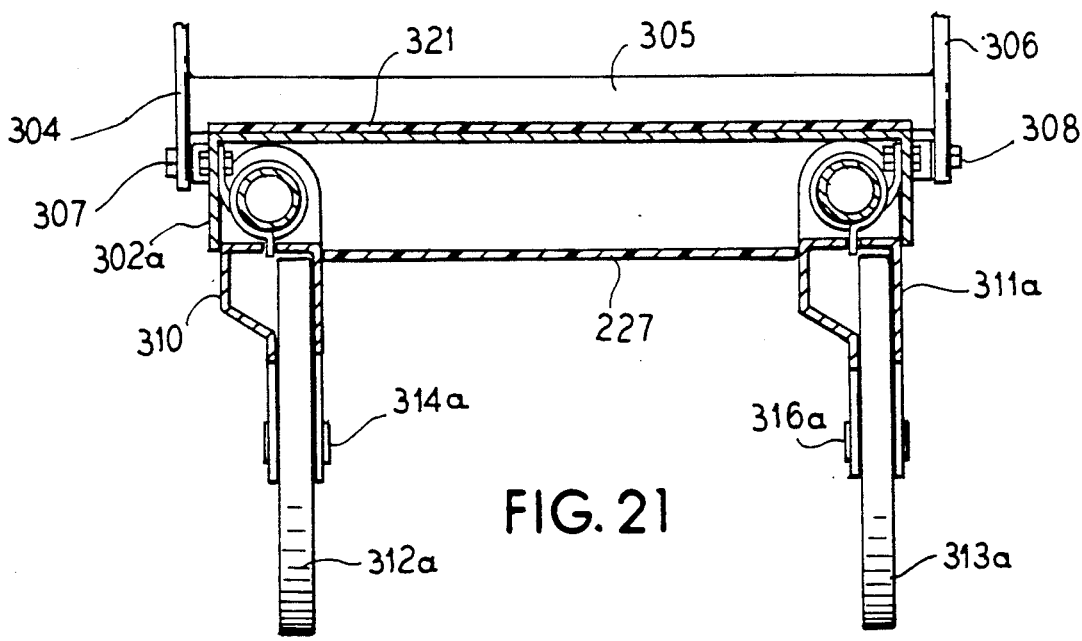
FIG. 21 is a top sectional view showing the wheels in the extended position.

FIGS. 19, 20 and 21 illustrate another modified form of the invention in which a frame member 302 receives opposite ends of a handle member 301 therein and modified wheel brackets 310a and 311a are pivotally mounted on the ends of the handle 301 which extend into the frame member 302a. The wheel brackets 310a and 311a are formed such that the wheels 312a and 313a are pivotally supported on the axles 314a and 316a such that they overlap in the stored position as shown in FIG. 20. Thus, the wheel bracket 310a is formed to be offset so that the wheel 312a fits closer to the upper portion of the frame member 302a relative to FIG. 20 and the wheel bracket 311a is offset so that the wheel 313a fits closer to the bottom portion relative to FIG. 20. The tray 303 has end portions 304 and 306 which are pivotally connected to the frame by bolts 307 and 308. Springs 331 and 332 have ends 333 and 334 which engage the wheel brackets 310a and 311a so as to bias them in the open position when the cover member is in the opened position.

FIG. 21 illustrates the overlapping wheels in the extended position wherein the slidable cover member 322 has been moved downwardly so that the front portion 227 locks the wheels in the open position.

Since the wheels overlap, a more compact luggage cart is provided.

The fact that the wheels are covered when in the stored position prevents the dirty wheels from coming in contact with the user's clothing. The box also serves as a fender to prevent mud and spray being thrown from the wheels.

Although the invention has been described with respect to preferred embodiments, it is not to be so limited as changes and modifications can be made which are within the full intended scope of the invention as defined by the appended claims.

We claim:

1. A collapsible luggage cart comprising: a container frame member with an upper wall, a lower wall, and side walls, a U-shaped handle having first and second legs with lower portions extending through said upper wall into opposite end portions of said frame member and being attached thereto, first and second wheel brackets pivotally connected to said lower portions within said opposite end portions, first and second wheels supported by said first and second wheel brackets, and a cover member having a front portion extending between said opposite end portions and a top portion overlapping said upper wall, said top portion having a pair of openings through which said legs extend, wherein the cover member is slidably mounted on the handle member and is movable upwardly relative to the frame member to permit the wheels to pivot between a stored position, in which the wheels are located in the frame member under the front portion of the cover member, and an extended position in which the wheels extend from the frame member and the front portion of the cover member extends between the brackets and the wheels.

2. A collapsible luggage cart according to claim 1 including first and second spring biasing means attached to said first and second wheel brackets to bias them to the open position.

3. A collapsible luggage cart according to claim 2 wherein said first spring biasing means is a first coiled spring which fits about said first leg of said handle and said second spring biasing means is a second coiled spring which fits about said second leg of said handle.

4. A collapsible luggage cart according to claim 2 wherein said first and second legs of said U-shaped handle are formed of a plurality of sections which are telescopically connected together and locking means for locking said plurality of sections in the extended position.

5. A collapsible luggage cart according to claim 4 wherein said locking means comprises spring biased pins which are receivable in holes of said plurality of said sections to lock them.

6. A collapsible luggage cart according to claim 5 including a collar moveably mounted on at least one of said sections and formed with a tapered end engageable with the ends of said spring biased pins to depress them to unlock said sections.

7. A collapsible luggage cart according to claim 5 wherein said holes are formed as curved slots such that if adjacent sections of the handle are rotated relative to each other the pins are depressed so that the sections are unlocked and can be telescoped together.

8. A collapsible luggage cart according to claim 2 wherein said first and second wheels overlap each other when in the stored position.

* * * * *